(12) United States Patent
Matsushita et al.

(10) Patent No.: US 9,989,131 B2
(45) Date of Patent: Jun. 5, 2018

(54) CHAIN GUIDE

(71) Applicant: TSUBAKIMOTO CHAIN CO., Osaka-shi, Osaka (JP)

(72) Inventors: Takahiro Matsushita, Osaka (JP); Manabu Hirayama, Osaka (JP); Ryo Segawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days. days.

(21) Appl. No.: 15/297,475

(22) Filed: Oct. 19, 2016

(65) Prior Publication Data

US 2017/0114874 A1 Apr. 27, 2017

(30) Foreign Application Priority Data

Oct. 21, 2015 (JP) ................................. 2015-207377

(51) Int. Cl.
*F16H 7/08* (2006.01)
*F16H 7/18* (2006.01)

(52) U.S. Cl.
CPC ......... *F16H 7/18* (2013.01); *F16H 2007/185* (2013.01)

(58) Field of Classification Search
CPC ...... F16H 2007/0872; F16H 7/18; F16H 7/08; F16H 2007/0804; F16H 2007/0812
USPC ................................................ 474/111, 140
See application file for complete search history.

(56) References Cited

U.S. PATENT DOCUMENTS

| 4,826,468 | A | * | 5/1989 | Friedrichs | F16H 7/08 474/101 |
| 4,832,664 | A | * | 5/1989 | Groger | F01L 1/02 123/90.15 |
| 4,869,708 | A | * | 9/1989 | Hoffmann | F01L 1/02 474/140 |
| 5,318,482 | A | * | 6/1994 | Sato | F16H 7/08 474/111 |
| 6,013,000 | A | * | 1/2000 | Moretz | F16H 7/08 474/111 |
| 6,120,403 | A | * | 9/2000 | Suzuki | F16C 11/04 474/111 |
| 6,336,881 | B1 | * | 1/2002 | Rapp | F01L 1/02 474/111 |
| 6,572,502 | B1 | * | 6/2003 | Young | F16H 7/08 474/111 |
| 6,601,473 | B2 | * | 8/2003 | Suzuki | F16H 7/18 474/110 |

(Continued)

FOREIGN PATENT DOCUMENTS

JP          2015-25535 A      2/2015

*Primary Examiner* — Henry Y Liu
(74) *Attorney, Agent, or Firm* — Westerman, Hattori, Daniels & Adrian, LLP

(57) ABSTRACT

A chain guide is provided that allows for stable running of a chain, causes less wear or damage on the inner surface of mounting holes or on mounting shafts, and improves the durability without increasing production cost. The guide shoe includes a guide rail and a unit holding part that accommodates a reinforcing unit inserted thereinto from the backside of the guide rail. The reinforcing unit includes a plate and a spacer. The plate and spacer are aligned in a guide width direction, so that a plate through hole and a spacer through hole are continuous in the guide width direction, and are disposed in the unit holding part 22.

3 Claims, 2 Drawing Sheets

(56) References Cited

U.S. PATENT DOCUMENTS

| | | | |
|---|---|---|---|
| 6,612,952 B1* | 9/2003 | Simpson | F16H 7/08 474/111 |
| 6,645,102 B2* | 11/2003 | Kumakura | F16H 7/18 474/111 |
| 6,692,390 B2* | 2/2004 | Ono | F16H 7/18 474/111 |
| 6,733,409 B2* | 5/2004 | Konno | F16H 7/18 474/111 |
| 6,796,917 B2* | 9/2004 | Konno | F16H 7/18 474/111 |
| 6,832,966 B2* | 12/2004 | Kawano | F16H 7/18 474/111 |
| 6,843,742 B2* | 1/2005 | Konno | F16H 7/18 403/13 |
| 6,884,192 B2* | 4/2005 | Konno | F16H 7/18 474/111 |
| 7,074,145 B2* | 7/2006 | Konno | F16H 7/18 474/111 |
| 7,074,146 B2* | 7/2006 | Fujikubo | F16H 7/0848 474/111 |
| 7,137,916 B2* | 11/2006 | Kurohata | F16H 7/18 474/111 |
| 8,083,623 B2* | 12/2011 | Cantatore | F16H 7/08 474/109 |
| 8,430,773 B2* | 4/2013 | Botez | F16H 7/18 474/111 |
| 8,430,774 B2* | 4/2013 | Konno | F16H 7/18 474/111 |
| 8,579,746 B2* | 11/2013 | Mori | F16H 7/06 474/140 |
| 8,617,012 B2* | 12/2013 | Young | F16H 7/08 474/111 |
| 8,696,501 B2* | 4/2014 | Ullein | F16H 7/08 474/111 |
| 8,876,642 B2* | 11/2014 | Adams | F16H 7/18 474/111 |
| 2002/0077204 A1* | 6/2002 | Kumakura | F16H 7/18 474/140 |
| 2002/0119848 A1* | 8/2002 | Tada | F16H 7/0829 474/111 |
| 2002/0132688 A1* | 9/2002 | Ono | F16H 7/18 474/111 |
| 2003/0064842 A1* | 4/2003 | Konno | F16H 7/18 474/111 |
| 2003/0064843 A1* | 4/2003 | Konno | F16H 7/18 474/111 |
| 2003/0078120 A1* | 4/2003 | Konno | F16H 7/18 474/111 |
| 2003/0078122 A1* | 4/2003 | Kawano | F16H 7/18 474/111 |
| 2003/0134704 A1* | 7/2003 | Konno | F01L 1/024 474/111 |
| 2003/0139236 A1* | 7/2003 | Konno | F16H 7/18 474/111 |
| 2003/0139237 A1* | 7/2003 | Konno | F16H 7/18 474/111 |
| 2003/0139238 A1* | 7/2003 | Konno | F16H 7/18 474/111 |
| 2003/0144100 A1* | 7/2003 | Konno | F16H 7/18 474/111 |
| 2003/0144101 A1* | 7/2003 | Konno | F16H 7/08 474/111 |
| 2004/0058762 A1* | 3/2004 | Konno | F16H 7/08 474/111 |
| 2004/0106484 A1* | 6/2004 | Sonobata | F16H 7/0848 474/111 |
| 2004/0147350 A1* | 7/2004 | Kurohata | F16H 7/18 474/111 |
| 2005/0026730 A1* | 2/2005 | Hashimoto | F16H 7/18 474/111 |
| 2005/0227800 A1* | 10/2005 | Shum | F01L 1/02 474/140 |
| 2005/0266946 A1* | 12/2005 | Thomas | B29C 45/1635 474/111 |
| 2005/0277506 A1* | 12/2005 | Konno | F16H 7/18 474/111 |
| 2006/0054121 A1* | 3/2006 | Koch | F01L 1/02 123/90.17 |
| 2006/0199689 A1* | 9/2006 | Yoshimoto | F16H 7/18 474/111 |
| 2008/0153643 A1* | 6/2008 | Franke | F16H 7/18 474/111 |
| 2008/0242460 A1* | 10/2008 | Hewitt | F16H 7/18 474/111 |
| 2009/0011879 A1* | 1/2009 | Sakamoto | F16H 7/18 474/111 |
| 2009/0036242 A1* | 2/2009 | Hayami | F16H 7/18 474/111 |
| 2009/0105022 A1* | 4/2009 | Cantatore | F16H 7/08 474/111 |
| 2010/0292037 A1* | 11/2010 | Botez | F16H 7/18 474/111 |
| 2011/0105258 A1* | 5/2011 | Konno | F16H 7/08 474/111 |
| 2011/0183797 A1* | 7/2011 | Konno | F16H 7/08 474/111 |
| 2012/0015769 A1* | 1/2012 | Adams | F16H 7/18 474/140 |
| 2012/0035010 A1* | 2/2012 | Young | F16H 7/08 474/111 |
| 2012/0052997 A1* | 3/2012 | Young | F16H 7/08 474/111 |
| 2014/0162819 A1* | 6/2014 | Young | F16H 7/08 474/111 |

* cited by examiner

CHAIN GUIDE

BACKGROUND OF THE INVENTION

1. Field of the Invention

The present invention relates to a chain guide having a guide shoe that slidably guides a chain, and a reinforcing unit that reinforces the guide shoe.

2. Description of the Related Art

It has been common practice to use a chain guide having a guide shoe that slidably guides a running chain to stabilize a chain running between sprockets and to keep an appropriate chain tension. As a system that uses this chain guide, for example, an engine timing system is known, wherein an endless timing chain runs over sprockets of a crankshaft and cam shafts inside an engine room. A chain guide is used to guide this endless timing chain passing over a drive sprocket of the crankshaft and a pair of driven sprockets of the cam shafts inside the engine room.

Guide rails of chain guides used in such known timing systems should preferably be made of a low-friction, high wear-resistance material, and therefore a guide entirely made of a low-friction resin material is known. On the other hand, the chain guide needs to have certain levels of strength, rigidity, and durability to be able to withstand the tension or vibration of the chain and to guide the chain stably. If the chain guide is made solely of a resin material, it needs to have a larger material thickness to achieve necessary strength, rigidity, and durability, and will end up occupying a larger space inside the engine room. Therefore, some known chain guides have their guide rail made of a low-friction resin material and reinforced with a material with high strength, rigidity, and durability such as metal, so as to reduce the occupying space while securing necessary strength, rigidity, and durability of the chain guide as a whole.

One of such known chain guides is formed by a guide shoe that slidably guides a running chain and a plate that reinforces the guide shoe along the guide longitudinal direction. The guide shoe has a plate holding part in the form of a slit-like groove, into which the plate can be inserted from a lower side thereof, on the backside of the guide rail. With the plate having high rigidity and durability being inserted into the plate holding part from below, the occupying space of the chain guide is reduced, while necessary strength, rigidity, and durability are secured as a whole (see Japanese Patent Application Laid-open No. 2015-025535).

SUMMARY OF THE INVENTION

According to Japanese Patent Application Laid-open No. 2015-025535, the chain guide has mounting holes for mounting shafts to pass through, which are used to attach the chain guide to an object of interest such as an engine block. Tubular parts are formed by burring at the edge of the mounting holes such as to protrude in the guide width direction. Therefore, the inner surface of the mounting hole and the mounting shaft make contact with each other in an increased area along the width direction, so that the chain guide is unlikely to incline relative to its proper orientation and capable of allowing stable running of the chain. Moreover, with the inner surface of the mounting hole and the mounting shaft making contact with each other in a wider area, they are less susceptible to load concentration, and less likely to suffer wear or damage on the inner surface of the mounting hole and on the mounting shaft.

However, while the tubular parts provide the effects described above in the chain guide described in Japanese Patent Application Laid-open No. 2015-025535, there is another problem that connecting portions between a flat part of the plate that can be warped largely and the tubular parts (base portions of the tubular parts) are more susceptible to concentration of internal stress generated inside the plate due to the force applied to the plate during the running of the chain, because of which the durability of the plate is compromised. Another problem is that since the tubular parts of the plate are formed by burring, certain limitations are imposed on the dimensional setting of the tubular parts in the guide width direction, and also the production cost of the plate is high.

The present invention solves these problems, its object being to provide a chain guide that allows for stable running of a chain, suffers less wear or damage on the inner surface of mounting holes or on mounting shafts, and improves the durability without causing an increase in production cost.

The present invention solves the problems described above by providing a chain guide including a guide shoe that slidably guides a chain, and a reinforcing unit that reinforces the guide shoe, wherein the guide shoe includes a guide rail extending along a guide longitudinal direction, and a unit holding part that accommodates the reinforcing unit inserted thereinto from a backside of the guide rail, and the reinforcing unit includes a plate having a plate through hole extending through the plate in a guide width direction, and a spacer having a spacer through hole extending through the spacer in the guide width direction. The plate and the spacer are aligned in the guide width direction, so that the plate through hole and the spacer through hole are continuous in the guide width direction, and are disposed in the unit holding part.

According to one aspect of the present invention, the plate and spacer are aligned in the guide width direction, so that the plate through hole and spacer through hole are continuous in the guide width direction, and are disposed in the unit holding part. The mounting shaft used for attaching the chain guide to an object of interest such as an engine block makes contact with the inner surface of mounting holes (plate through hole and spacer through hole) over a longer area in the guide width direction, so that the chain guide is less likely to be inclined relative to its proper orientation and can thus allow for stable running of the chain. Moreover, with the inner surface of the mounting holes and the mounting shaft making contact with each other in a wider area, the chain guide does not suffer a concentrated load, which results in less wear or damage on the inner surface of the mounting holes and on the mounting shaft, as well as provides the following effects:

Namely, with the spacer provided separately from the plate, the mounting hole for inserting the mounting shaft is formed so that the length in the guide width direction of the mounting hole for inserting the mounting shaft can be freely adjusted by changing the size of the spacer in the guide width direction.

Since there is no need to form a tubular part that protrudes in the guide width direction to the plate, the production cost of the plate can be reduced. Moreover, the connecting portion between the flat part and the tubular part of the plate is prevented from suffering concentration of internal stress that is generated inside the plate due to the force applied to the plate during the running of the chain, and thus the plate can have improved durability.

According to another aspect of the present invention, the spacer is disposed in the unit holding part with a spacer locking portion formed on the guide shoe and the plate sandwiching the spacer in the guide width direction, and part of the spacer makes protrusion/recess engagement with the plate in the guide width direction. Thus the spacer disposed inside the unit holding part can be prevented from coming off from the backside of the guide rail with a simple structure. Attachment of the reinforcing unit to the guide shoe only requires a simple operation of inserting the reinforcing unit into the unit holding part after fitting the spacer to the plate to make protrusion/recess engagement therewith.

According to another aspect of the present invention, the spacer includes a tubular body in which the spacer through hole is formed, and a flange formed at one end of the tubular body, and the flange formed on the spacer is disposed in the unit holding part with the spacer locking portion and the plate sandwiching the flange in the guide width direction. This way, the size of the tubular body can be freely set in the guide width direction, so that the length of the mounting hole for inserting the mounting shaft can be adjusted freely in the guide width direction.

DESCRIPTION OF THE PREFERRED EMBODIMENTS

A chain guide 10 according to one embodiment of the present invention will be hereinafter described with reference to the drawings.

The chain guide 10 according to one embodiment of the present invention is used as part of a timing system equipped inside an engine room and fixed to an engine block, which is an object of interest, to slidably guide a chain running over sprockets.

Figure 1:
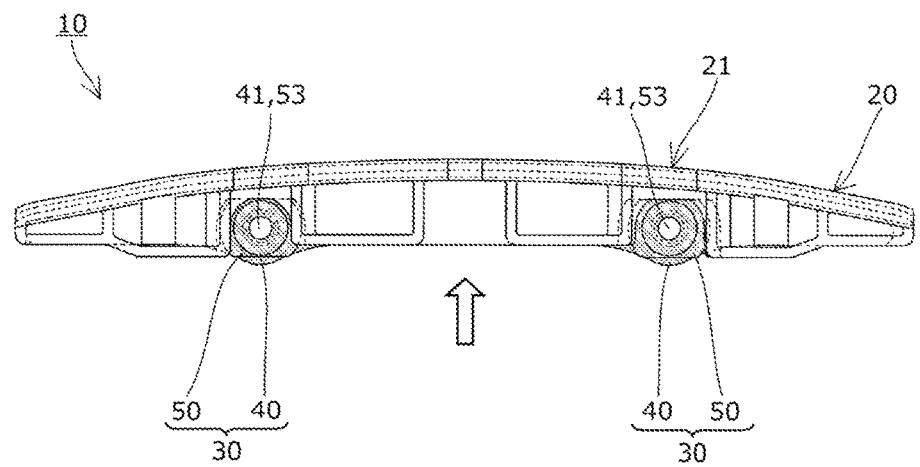
FIG. 1 is an illustrative diagram showing a chain guide that is one embodiment of the present invention.
Figure 2:
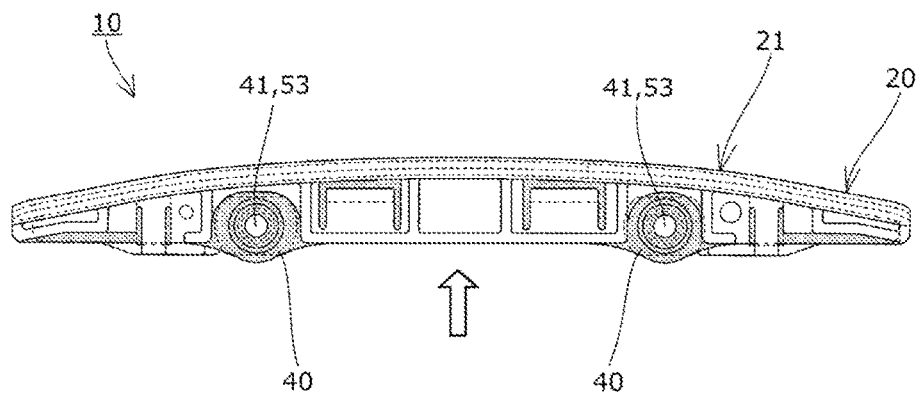
FIG. 2 is an illustrative diagram showing the chain guide viewed from the opposite side from that of FIG. 1.
Figure 3:
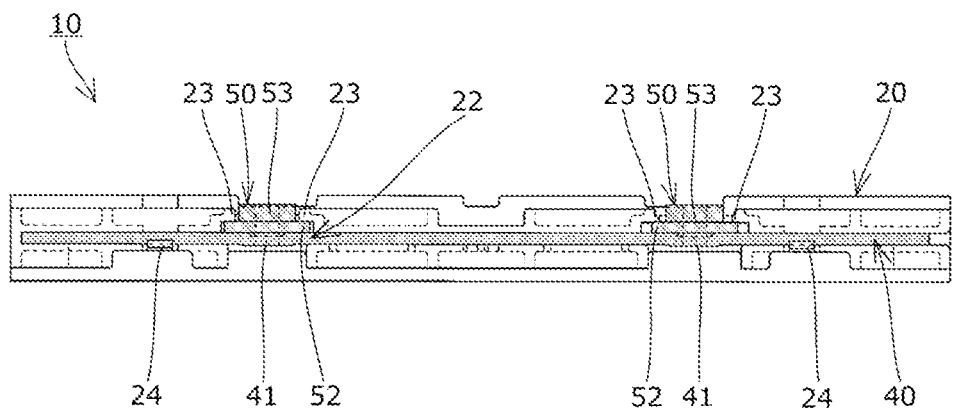
FIG. 3 is an illustrative diagram showing the chain guide viewed from below.

The chain guide 10 includes, as shown in FIG. 1 to FIG. 3, a guide shoe 20 that slidably guides the running chain along a guide longitudinal direction, and a reinforcing unit 30 that is removably attached to the guide shoe 20 and reinforces the guide shoe 20.

The guide shoe 20 has a guide rail 21 that guides the chain along the guide longitudinal direction on the upper side facing the chain, as shown in FIGS. 1 and 2.

The guide shoe 20 also has a unit holding part 22 in the form of a slit-like groove for accommodating the reinforcing unit 30 inserted thereinto from the backside of the guide rail 21 (underside of the guide shoe 20, in the direction of arrow in FIGS. 1 and 2).

Figure 4:
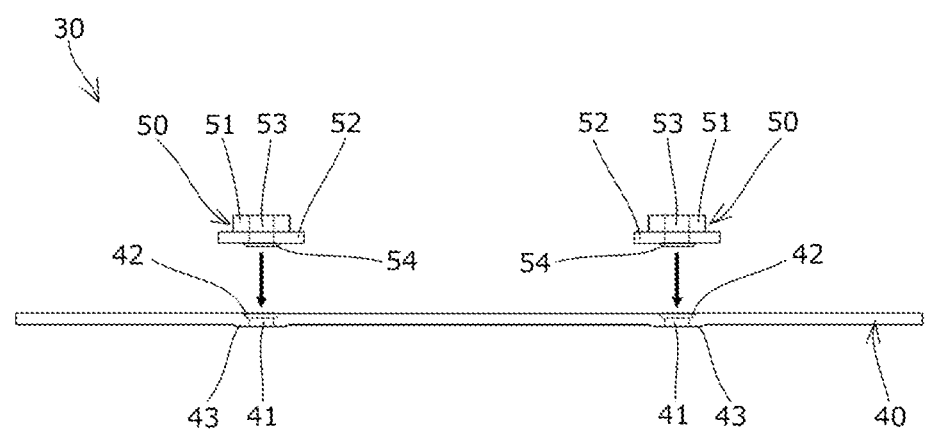
FIG. 4 is a plan view showing a plate and spacers that form a reinforcing unit.

The reinforcing unit 30 is formed by a plate 40 having plate through holes 41 extending through in the guide width direction, and two spacers 50 each having a spacer through hole 53 extending through in the guide width direction, as shown in FIGS. 3 and 4.

The plate through holes 41 are formed in the plate 40 at two positions distanced from each other in the guide longitudinal direction as shown in FIG. 1. The plate 40 and spacers 50 are aligned in the guide width direction, so that the plate through holes 41 and spacer through holes 53 are continuous in the guide width direction, and are disposed in the unit holding part 22, as shown in FIG. 3. The plate through holes 41 and spacer through holes 53 arranged to be continuous in the guide width direction function as mounting holes for inserting mounting shafts that are used for attaching the chain guide 10 to an engine block. The spacers 50 are disposed on the side facing the engine block, and function as parts that will be in contact with the engine block when the chain guide 10 is attached to the engine block.

The plate 40 includes, as shown in FIG. 4, the two plate through holes 41 mentioned above, annular recesses 42 formed by recessing the edge of the plate through holes 41 on one side of the plate 40 facing the spacers 50, and annular protrusions 43 formed by projecting the edge of the plate through holes 41 on the other side of the plate 40. These annular recesses 42 and annular protrusions 43 can be formed at one time by a pressing process performed to the edges of the plate through holes 41 from one side of the plate 40 facing the spacers 50 to the other side.

Each spacer 50 includes, as shown in FIGS. 3 and 4, a cylindrical tubular body 51 in which the spacer through hole 53 is formed, a flange 52 formed at one end of the tubular body 51, and an annular boss 54 formed by projecting the edge of the spacer through hole 53 on one side facing the plate 40. With the reinforcing unit 30 being disposed in the unit holding part 22, each annular boss 54 is received in the annular recess 42 of the plate 40.

The reinforcing unit 30 is attached to the guide shoe 20 as follows: the spacers 50 are set in the plate 40 such that the annular bosses 54 of the spacers 50 fit in the annular recesses 42 of the plate 40, as shown in FIG. 4, after which the plate 40 and spacers 50 are inserted into the unit holding part 22 of the guide shoe 20 from the underside.

When the reinforcing unit 30 is inserted into the unit holding part 22, the plate 40 is restricted from moving to both sides in the guide longitudinal direction, both sides in the guide width direction, and upward in the guide height direction, by the peripheral walls of the unit holding part 22, and also prevented from coming out of the underside of the guide shoe 20 by locking pawls 24 formed to the guide shoe 20.

When the reinforcing unit 30 is inserted into the unit holding part 22, the spacers 50 are restricted from moving to both sides in the guide width direction as the flanges 52 are sandwiched in the guide width direction between the spacer locking portions 23 formed to the guide shoe 20 and the plate 40. The spacers 50 are restricted from moving to both sides in the guide longitudinal direction, and upward in the guide height direction by the peripheral walls of the unit holding part 22, and also prevented from coming out of the underside of the guide shoe 20 by engagement between the annular bosses 54 of the spacers 50 and the annular recesses 42 of the plate 40.

While one embodiment of the present invention have been described in detail, the present invention is not limited to the above-described embodiment and may be carried out with various design changes without departing from the scope of the present invention set forth in the claims.

For example, while the chain guide was described as a component to be incorporated in a timing system of an engine in the embodiment above, the chain guide can be applied to various other equipment other than this.

The chain tensioner may not necessarily be applied to a chain transmission mechanism but also used for similar transmission mechanisms that use belts, ropes and the like, and can be applied in a variety of industrial fields.

For example, the material of the guide shoe may be selected from known suitable materials in accordance with various conditions such as elasticity, friction resistance, rigidity, durability, formability, cost, and so on. Synthetic resin materials are particularly suitable.

The material of the plate and spacers that form the reinforcing unit may be selected from, for instance, metal materials, as appropriate, in accordance with various conditions such as rigidity, durability, formability, cost, and so on.

While the chain guide is configured as a fixed guide fixedly attached to the engine block in the embodiment described above, the chain guide may be configured as a pivotal guide pivotally supported inside the engine room. If the chain guide is configured as a pivotal guide, there need be only one mounting hole in the plate for passing the mounting shaft and the like for attaching the chain guide to an object of interest such as an engine block. More specifically, the plate may have one plate through hole, and one spacer.

In the embodiment described above, the spacer is prevented from coming out of the underside of the guide shoe by engagement between the annular bosses formed on the spacers and the annular recesses formed in the plate. To prevent the spacer from coming out of the underside of the guide shoe, the spacer only needs to partly make protrusion/recess engagement with the plate in the guide width direction. For example, a recess formed in the spacer may make engagement with a protrusion on the plate. Alternatively, the spacer may not necessarily have a protruded part on the side facing the plate and the spacer on the side facing the plate may entirely make engagement with an annular recess in the plate.

What is claimed is:

1. A chain guide, comprising:
    a guide shoe that slidably guides a chain, and
    a reinforcing unit that reinforces said guide shoe,
    wherein said reinforcing unit includes a plate having a plate through hole extending through the plate in a guide width direction, and a spacer having a spacer through hole extending through the spacer in the guide width direction,
    wherein said guide shoe integrally includes
        a guide rail extending along a guide longitudinal direction,
        a unit holding part that opens to a backside of said guide rail and accommodates said reinforcing unit inserted thereinto from the backside of said guide rail, said backside of said guide rail being a side of the guide rail opposite to a sliding surface of the chain on the guide shoe,
        a locking pawl that makes engagement with the plate accommodated in the unit holding part and prevents the plate from coming out of an underside of the guide shoe, and
        a spacer locking portion that touches the spacer accommodated in the unit holding part,
    wherein said plate and said spacer being aligned in the guide width direction, so that said plate through hole and said spacer through hole are continuous in the guide width direction, and being inserted and disposed in said unit holding part from the backside of the guide rail,
    wherein said spacer is disposed in said unit holding part, with said spacer being sandwiched between the spacer locking portion and said plate in the guide width direction, and
    wherein a part of the spacer forming a protrusion/recess engagement with said plate in the guide width direction.

2. The chain guide according to claim 1, wherein
    said spacer includes an annular boss formed by protruding an edge of said spacer through hole on a side facing said plate, while
    said plate includes an annular recess formed by recessing an edge of said plate through hole on a side facing said spacer,
    said annular boss being received in said annular recess.

3. The chain guide according to claim 1, wherein
    said spacer includes a tubular body in which said spacer through hole is formed, and a flange formed at one end of said tubular body, and
    said flange is disposed in said unit holding part, said flange being sandwiched between said spacer locking portion and said plate in the guide width direction.

* * * * *